US011634642B2

(12) United States Patent
Raether et al.

(10) Patent No.: US 11,634,642 B2
(45) Date of Patent: Apr. 25, 2023

(54) BIODEGRADABLE SURFACTANT

(71) Applicant: BASF SE, Ludwigshafen am Rhein (DE)

(72) Inventors: Roman Benedikt Raether, Ludwigshafen (DE); Juergen Tropsch, Ludwigshafen (DE); Christian Bittner, Ludwigshafen (DE); Thomas Wesley Holcombe, Ludwigshafen (DE); Michael Bernhard Schick, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 247 days.

(21) Appl. No.: 16/629,474

(22) PCT Filed: Jul. 12, 2018

(86) PCT No.: PCT/EP2018/068976
§ 371 (c)(1),
(2) Date: Jan. 8, 2020

(87) PCT Pub. No.: WO2019/012055
PCT Pub. Date: Jan. 17, 2019

(65) Prior Publication Data
US 2020/0139323 A1 May 7, 2020

(30) Foreign Application Priority Data
Jul. 14, 2017 (EP) ..................................... 17181444

(51) Int. Cl.
| C09K 23/00 | (2022.01) |
| C08G 65/26 | (2006.01) |
| C08L 71/02 | (2006.01) |
| C11D 1/72  | (2006.01) |

(52) U.S. Cl.
CPC .......... C09K 23/00 (2022.01); C08G 65/2609 (2013.01); C08L 71/02 (2013.01); C11D 1/721 (2013.01)

(58) Field of Classification Search
CPC ............ B01F 17/0028; C08G 65/2606; C08G 65/2609; C08L 71/02; C11D 1/721; C11D 1/722
See application file for complete search history.

(56) References Cited

U.S. PATENT DOCUMENTS

| 3,539,519 A | 11/1970 | Weimer |
| 4,317,940 A | 3/1982 | Scardera et al. |
| 4,925,587 A | 5/1990 | Schenker et al. |
| 5,158,922 A | 10/1992 | Hinney et al. |
| 6,007,584 A | 12/1999 | Suzuki et al. |
| 6,057,284 A | 5/2000 | Baur et al. |
| 6,140,297 A | 10/2000 | Ishii et al. |
| 6,303,833 B1 | 10/2001 | Grosch et al. |
| 6,613,714 B2 | 9/2003 | Grosch et al. |
| 6,689,710 B2 | 2/2004 | Grosch et al. |
| 6,963,014 B1 | 11/2005 | Zeller et al. |
| 2005/0215452 A1* | 9/2005 | Ruland .................. A61Q 19/10 510/421 |
| 2007/0065391 A1 | 3/2007 | Klumpe et al. |
| 2012/0103635 A1 | 5/2012 | Sanders et al. |

FOREIGN PATENT DOCUMENTS

| CA | 2152240 A1 | 12/1995 |
| CA | 2263289 A1 | 2/1998 |
| EP | 0688755 A1 | 12/1995 |
| WO | 9806312 A1 | 2/1998 |
| WO | 9916775 A1 | 4/1999 |
| WO | 0074845 A1 | 12/2000 |
| WO | 0136356 A2 | 5/2001 |
| WO | 0164772 A1 | 9/2001 |
| WO | 2005085321 A1 | 9/2005 |
| WO | 2007014964 A2 | 2/2007 |

OTHER PUBLICATIONS

European Search Report for EP Patent Application No. 17181444.5, dated Apr. 11, 2018, 5 pages.
Jones, et al., "258. Aliphatic Friedel-Crafts reactions. Part IV. The preparation of divinyl ketones", Journal of the Chemical Society (Resumed), Issue 0, 1961, pp. 1345-1347.
Von Bernhard Wojtech, "Zur Darstellung Hochmolekularer Polyathylenoxyde", Die Makromolekulare Chemie, vol. 66, Issue 1, 1963, pp. 180-195.
International Search Report for International Application No. PCT/EP2018/068976, dated Sep. 21, 2018, 5 pages.
Written Opinion of the International Searching Authority for International Application No. PCT/EP2018/068976, dated Sep. 21, 2018, 7 pages.

* cited by examiner

Primary Examiner — Robert S Jones, Jr.
(74) Attorney, Agent, or Firm — Armstrong Teasdale LLP

(57) ABSTRACT

The present disclosure is related to a surfactant comprising at least one C8 to C30 branched alkanol alkoxylate, a process for the preparation of the surfactant, an article comprising the surfactant, and a use of the surfactant. Also disclosed are readily biodegradable surfactants obtained from branched aliphatic alcohols and including a polyethylene oxide block.

17 Claims, No Drawings

BIODEGRADABLE SURFACTANT

CROSS-REFERENCE TO RELATED APPLICATIONS

This application is a U.S. National Phase Application of PCT/EP2018/068976, filed Jul. 12, 2018, which claims the benefit of priority to EP Application No. 17181444.5, filed Jul. 14, 2017, the contents of which are hereby expressly incorporated by reference in their entirety.

FIELD OF THE INVENTION

The present invention is related to a surfactant comprising at least one $C_8$ to $C_{30}$ branched alkanol alkoxylate, a process for the preparation of said surfactant, an article comprising said surfactant as well as the use thereof.

BACKGROUND OF THE INVENTION

The application of alkanol alkoxylates as surfactants, emulsifiers and antifoaming agents is well known in the art. For instance, non-ionic surfactants featured by a low surface tension and excellent emulsifier properties which are applicable for hard surfaces can be obtained by alkoxylation of branched aliphatic alcohols.

However, with regard to stricter environmental regulations and the desire for environmental sustainability, biodegradability is also a desired property of surfactants. It is well known that alkoxylated linear alcohols such as fatty alcohols are readily biodegradable. U.S. Pat. Nos. 4,925,587, 4,317,940 and 4,317,940 describe linear alcohols alkoxylated with blocks of polyethylene oxide (PO) and ethylene oxide (EO) which are readily biodegradable surfactants. Said surfactants are based on linear alcohols since the application of branched alcohols has a detrimental effect on biodegradability. It has been confirmed that alkoxylated branched alcohols do not show a significant degradation while significant degradation was observed using surfactants based on linear alcohols.

Alkanol alkoxylates based on linear alcohols, however, are not featured by a superior surface activity like wetting of different surfaces and emulsion stability comparable with alkoxylates obtained from branched alcohols which, on the other hand, are not readily biodegradable.

Since biodegradability also becomes more important in the fields of application of branched alkanol alkoxylate surfactants having an excellent surface activity, there is a need in the art for readily biodegradable surfactants obtained from branched aliphatic alcohols.

Accordingly, it is an object of the present invention to provide biodegradable branched alkanol alkoxylate surfactants. Further, it is an object of the present invention to provide a process for the preparation of said biodegradable branched alkanol alkoxylate surfactants.

SUMMARY OF THE INVENTION

The foregoing and other objects are solved by the subject-matter of the present invention.

According to a first aspect of the present invention, a surfactant of formula (I)

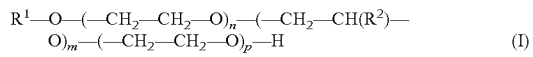

(I)

wherein
$R^1$ is selected from the group consisting of 2-dodecyl, 2-ethylhexyl, 2-propylheptyl, iso-tridecyl, 2-tetradecyl, 2-hexadecyl, 7-ethyl-3-decyl, 3-methyl-6-ethyl-2-nonyl, 2-hexadecyl, 2-octadecyl, 3-nonadecyl, 3-methyl-2-octadecyl, 3-methyl-2-hexadecyl, 3-heptadecyl, iso-decyl, iso-undecyl, iso-dodecyl, 2-butyloctyl, 2-pentylnonyl and 2-hexyldecyl,
$R^2$ stands for methyl or ethyl,
n is the range of 4 to 6,
m is the range of 5 to 20, and
p is in the range of 0 to 25,
and wherein p is 0 when $R^1$ is 2-propylheptyl, $R^2$ is methyl and m is in the range of 1 to 10.
is provided.

It was surprisingly found by the inventors that alkanol alkoxylate surfactants of formula R-EO-PO or R-EO-PO-EO having a polyethylene oxide block (EO) between the alkanol residue block W and the polypropylene oxide block (PO) are featured by a high degree of biodegradability.

According to another embodiment of the present invention, the ratio n/m is in the range of 0.05 to 3.0 and the ratio p/m is in the range of 0.0 to 5.0.

It is especially preferred that n is in the range of 5 to 6, m is in the range of 6 to 18, and p is in the range of 0 to 2.

According to a further embodiment of the present invention, m is in the range of 10 to 20 when p is equal or above 1.

According to one embodiment of the present invention, the surfactant is of formula (Ia)

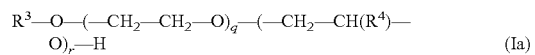

(Ia)

wherein
$R^3$ is selected from the group consisting of 2-dodecyl, 2-ethylhexyl, 2-propylheptyl, iso-tridecyl, 2-tetradecyl, 2-hexadecyl, 7-ethyl-3-decyl, 3-methyl-6-ethyl-2-nonyl, 2-hexadecyl, 2-octadecyl, 3-nonadecyl, 3-methyl-2-octadecyl, 3-methyl-2-hexadecyl, 3-heptadecyl, iso-decyl, iso-undecyl, iso-dodecyl, 2-butyloctyl, 2-pentylnonyl and 2-hexyldecyl,
$R^4$ stands for methyl or ethyl,
q is the range of 4 to 6, and
r is the range of 5 to 20.

According to another embodiment of the present invention, the ratio q/r is in the range of 0.05 to 3.0.

According to a further embodiment of the present invention, q is in the range of 5 to 6 and r is in the range of 6 to 18.

According to one embodiment of the present invention, $R^2$ and/or $R^4$ is methyl.

It is especially preferred that $R^1$ and/or $R^3$ is selected from the group consisting of 2-propylheptyl and iso-tridecyl.

According to one embodiment of the present invention, the surfactant is biodegradable.

According to another embodiment of the present invention, biodegradability is achieved at decomposition percentages of at least 60% determined in accordance with OECD 301B or OECD 301F.

The present invention is also directed to a process for the preparation of a surfactant as defined above, comprising the steps of
a) reacting an alcohol of formula $R^1OH$ with ethylene oxide under alkoxylation conditions, b) reacting the product obtained in step a) with propylene oxide or butylene oxide under alkoxylation conditions, thereby obtaining the surfactant of formula (I) or (Ia), and c) optionally reacting the product obtained in step b) with ethylene oxide under alkoxylation conditions, thereby obtaining the surfactant of formula (I).

The present invention is further directed to the use of a surfactant as described above in cleaning formulations, cosmetic and pharmaceutical formulations, finishes, coating materials, paints, pigment preparations and adhesives, leather decreasing agents, formulations for the textile industry, fiber processing formulations for the paper and pulp industry, metal processing formulations, oil production applications, oil field applications, tertiary oil production, food industry applications, water treatment, fermentation, mineral processing and dust control, building assistants, emulsion polymerization and preparation of dispersions, coolants and lubricants.

The present invention is also directed to a detergent, cleaning agent, wetting agent, coating material, adhesive, leather fat liquoring agent, humectant or textile treatment composition, additive for mineral building materials or cosmetic, additive for mineral oil formulations, pharmaceutical or crop protection formulation, containing the surfactant as described above.

In the following, the present invention is described in more detail.

DETAILED DESCRIPTION OF THE INVENTION

A surfactant of formula (I)

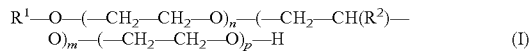

$$R^1-O-(-CH_2-CH_2-O-)_n-(-CH_2-CH(R^2)-O-)_m-(-CH_2-CH_2-O-)_p-H \quad (I)$$

wherein
$R^1$ stands for branched $C_8$ to $C_{30}$ alkyl or alkylene,
$R^2$ stands for methyl or ethyl,
n is the range of 3 to 10,
m is the range of 5 to 35, and
p is in the range of 0 to 25
is provided.

It was surprisingly found that alkanol alkoxylate surfactants of formula (I) having a polyethylene oxide block (EO)—$(-CH_2-CH_2-O-)_n$— adjacent to the radical $R^1$ of formula (I), respectively, are readily biodegradable.

The radical $R^1$ is a branched alkyl or alkylene chain having 8 to 30 carbon atoms, preferably 9 to 30, more preferably 9 to 20, still more preferably 9 to 18.

A branched alkyl chain radical has as a rule a degree of branching of from 0.1 to 4.5, preferably from 1.0 to 3.5. The term "degree of branching" is defined here in a manner known in principle as the number of methyl groups in the radical $R^1$ minus 1. The average degree of branching is the statistical mean value of the degrees of branching of all molecules of a sample. It can be determined by the use of $^1$H-NMR of either the starting alcohol or the respective surfactant made thereof.

Preferably, the radical $R^1$ is a branched alkyl chain having 8 to 30 carbon atoms, preferably 9 to 30, more preferably 9 to 20, still more preferably 9 to 18.

According to a preferred embodiment, $R^1$ is selected from the group consisting of 2-dodecyl, 2-ethylhexyl, 2-propylheptyl, iso-tridecyl, 2-tetradecyl, 2-hexadecyl, 7-ethyl-3-decyl, 3-methyl-6-ethyl-2-nonyl, 2-hexadecyl, 2-octadecyl, 3-nonadecyl, 3-methyl-2-octadecyl, 3-methyl-2-hexadecyl, 3-heptadecyl, iso-decyl, iso-undecyl, iso-dodecyl, 2-butyloctyl, 2-pentylnonyl and 2-hexyldecyl.

It is particularly preferred that the radical $R^1$ is selected from 2-ethylhexyl, 2-propylheptyl or iso-tridecyl.

The surfactant of formula (I) further contains a polyalkylenyloxy residue wherein the polyalkylenyloxy residue of formula (I) comprises the units —$(-CH_2-CH_2-O-)_n$, —$(-CH_2-CH(R^2)-O-)_m$ and —$(-CH_2-CH_2-O-)_p$. Said units are arranged in the block structure as indicated in formula (I). The transition between the blocks can be abrupt or continuous.

The value n of the first EO-block —$(-CH_2-CH_2-O-)_n$ is in the range of 3 to 10, more preferably 4 to 9, still more preferably 5 to 6. Said numbers are average values of distributions.

Regarding the block —$(-CH_2-CH(R^2)-O-)_m$, the radical $R^2$ is methyl or ethyl. It is particularly preferred that the radical $R^2$ is methyl. Accordingly, it is preferred that the block —$(-CH_2-CH(R^2)-O-)_m$ is a PO-block.

The orientation of the radical $R^2$ depends on the alkoxylation conditions, for instance on the catalyst applied for alkoxylation. The alkenyloxy groups can be incorporated into the surfactant in the orientation —$(-CH_2-CH(R^2)-O-)_m$ or in the inverse orientation —$(-CH(R^2)-CH_2-O)_m$. The presentation in formula (I) is, therefore, not restricted to a specific orientation of the radical $R^2$.

The value m of the block —$(-CH_2-CH(R^2)-O-)_m$ is in the range of 3 to 35, more preferably 5 to 20, still more preferably 6 to 18. Said numbers are average values of distributions.

The value p of the second EO-block —$(-CH_2-CH_2-O-)_p$ are independently from each other in the range of 0 to 25, more preferably 0 to 10, still more preferably 0 to 5. Said numbers are also average values of distributions.

According to a particularly preferred embodiment of the present invention, the inventive surfactant is a compound of formula (I) wherein
$R^1$ is iso-tridecyl,
$R^2$ is methyl,
n is in the range of 4 to 6,
m is in the range of 5 to 18, and
p is in the range of 2 to 4.

According to another particularly preferred embodiment of the present invention, the inventive surfactant is a compound of formula (I) wherein
$R^1$ is iso-tridecyl,
$R^2$ is methyl,
n is 5,
m is 5 and
p is 2.

According to a preferred embodiment of the present invention, the value m is in the range of 10 to 35, more preferably in the range of 15 to 25, still more preferably in the range of 18 to 23 when the value p is equal or above 1.

Therefore, according to another particularly preferred embodiment of the present invention, the inventive surfactant is a compound of formula (I) wherein
$R^1$ is iso-tridecyl,
$R^2$ is methyl,
n is 5,
m is 18 and
p is 2.

In case the values p is 0, the inventive surfactants of formula (I) are diblock copolymers having the structure $R^1-(-CH_2-CH_2-O-)_n-(-CH_2-CH(R^2)-O-)_m$.

According to one embodiment of the present invention, it is preferred that the value p is 0.

Accordingly, it is preferred that the surfactant is of formula (Ia)

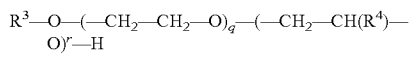 (Ia)

wherein
$R^3$ stands for branched $C_8$ to $C_{30}$ alkyl or alkylene,
$R^4$ stands for methyl or ethyl,
q is the range of 3 to 10, and
r is the range of 3 to 35.

The radical $R^3$ is a branched alkyl or alkylene chains having 8 to 30 carbon atoms, preferably 9 to 30, more preferably 9 to 20, still more preferably 9 to 18.

Preferably, the radical $R^3$ is a branched alkyl chain.

Regarding the term "branched alkyl chain", reference is made to the definition provided above.

Preferably, the radical $R^3$ is a branched alkyl chain having 8 to 30 carbon atoms, preferably 9 to 30, more preferably 9 to 20, still more preferably 9 to 18.

As outlined above, $R^3$ is selected from the group consisting of 2-dodecyl, 2-ethylhexyl, 2-propylheptyl, iso-tridecyl, 2-tetradecyl, 2-hexadecyl, 7-ethyl-3-decyl, 3-methyl-6-ethyl-2-nonyl, 2-hexadecyl, 2-octadecyl, 3-nonadecyl, 3-methyl-2-octadecyl, 3-methyl-2-hexadecyl, 3-heptadecyl, iso-decyl, iso-undecyl, iso-dodecyl, 2-butyloctyl, 2-pentylnonyl and 2-hexyldecyl.

It is particularly preferred that the radical $R^3$ is selected from 2-ethylhexyl, 2-propylheptyl or iso-tridecyl.

Even more preferably, $R^3$ is selected from 2-propylheptyl or iso-tridecyl.

The surfactant of formula (Ia) further contains a polyalkylenyloxy residue wherein the polyalkylenyloxy residue of formula (I) comprises the units $-(-CH_2-CH_2-O-)_q$ and $-(-CH_2-CH(R^2)-O-)_r$. Said units are arranged in the block structure as indicated in formula (Ia). The transition between the blocks can be abrupt or continuous.

The value q of the EO-block $-(-CH_2-CH_2-O-)_q$ is in the range of 3 to 10, more preferably 4 to 9, still more preferably 5 to 6. Said numbers are average values of distributions.

Regarding the block $-(-CH_2-CH(R^4)-O-)-$ the radical $R^4$ is methyl or ethyl. It is particularly preferred that the radical $R^4$ is methyl. Accordingly, it is preferred that the block $-(-CH_2-CH(R^4)-O-)_r$ is a PO-block.

The orientation of the radical $R^4$ depends on the alkoxylation conditions, for instance on the catalyst applied for alkoxylation. The alkenyloxy groups can be incorporated into the surfactant in the orientation $-(-CH_2-CH(R^4)-O-)_r$ or in the inverse orientation $-(-CH(R^4)-CH_2-O-)_r-$. The presentation in formula (Ia) is, therefore, not restricted to a specific orientation of the radical $R^4$.

The value r of the block $-(-CH_2-CH(R^4)-O-)_r$ in the range of 3 to 35, more preferably 5 to 20, still more preferably 6 to 18. Said numbers are average values of distributions.

Preferably, the ratio q/r is in the range of 0.05 to 3.0.

It is particularly preferred that q is in the range of 4 to 6 and r is in the range of 3 to 18.

According to a particularly preferred embodiment of the present invention, the inventive surfactant is a compound of formula (Ia) wherein
$R^3$ is 2-propylheptyl,
$R^4$ is methyl,
q is in the range of 4 to 6, and
r is in the range of 3 to 15.

According to a another particularly preferred embodiment of the present invention, the inventive surfactant is a compound of formula (Ia) wherein
$R^3$ is 2-propylheptyl,
$R^4$ is methyl,
q is in the range of 4 to 6, and
r is in the range of 3 to 5.

According to a particularly preferred embodiment of the present invention, the inventive surfactant is a compound of formula (Ia) wherein
$R^3$ is 2-propylheptyl,
$R^4$ is methyl,
q is in the range of 4 to 6, and
r is in the range of 5 to 15.

According to a another particularly preferred embodiment of the present invention, the inventive surfactant is a compound of formula (Ia) wherein
$R^3$ is 2-propylheptyl,
$R^4$ is methyl,
q is in the range of 4 to 6, and
r is 5.

According to a still another particularly preferred embodiment of the present invention, the inventive surfactant is a compound of formula (Ia) wherein
$R^3$ is 2-propylheptyl,
$R^4$ is methyl,
q is 5, and
r is 15.

According to a further particularly preferred embodiment of the present invention, the inventive surfactant is a compound of formula (Ia) wherein
$R^3$ is iso-tridecyl,
$R^4$ is methyl,
q is 5, and
r is in the range of 16 to 23.

According to a further particularly preferred embodiment of the present invention, the inventive surfactant is a compound of formula (Ia) wherein
$R^3$ is iso-tridecyl,
$R^4$ is methyl,
q is 5, and
r is in the range of 16 to 20.

The transition between the blocks of formulas (I) and (Ia), if existent, can be abrupt or continuous depending on the process conditions for the preparation of the surfactants. A continuous transition between two blocks means that a transition zone is located between two blocks comprising monomers of both blocks. For instance, the first EO block of formula (I) $-(-CH_2-CH_2-O-)_n-$ may comprise units of the block $-(-CH_2-CH(R^2)-O)_m-$ and the block $-(-CH_2-CH(R^2)-O)_m-$ may comprise units of the first EO block $-(-CH_2-CH_2-O-)_n-$, wherein said units are not distributed statistically within the entire block, but are located within the transition zone. Thus, a block structure within the meaning of the present invention means that the blocks comprise at least 85 mol-%, more preferably 90 mol-%, still more preferably 95 mol-% of the respective units, based on the overall amount of the respective block.

As outlined above, the surfactant according to the present invention is biodegradable. Thus, it is preferred that the surfactants of formulas (I) and (Ia) are biodegradable.

Preferably, biodegradability is achieved at decomposition percentages of at least 60%, more preferably at least 65%, still more preferably at least 70%, determined in accordance with OECD 301B or OECD 301F.

The present invention is also directed to a process for the preparation of the surfactant of formula (I), comprising the steps of
a) reacting an alcohol of formula $R^1OH$ with ethylene oxide under alkoxylation conditions,
b) reacting the product obtained in step a) with propylene oxide or butylene oxide under alkoxylation conditions, and
c) optionally reacting the product obtained in step b) with ethylene oxide under alkoxylation conditions, thereby obtaining the surfactant of formula (I).

The surfactant of formula (I) is prepared by means of an at least two-stage process in which, in a first process step a), an alcohol $R^1OH$ is alkoxylated with ethylene oxide to give an alkoxylated alcohol of formula $R^1\text{-}(EO)_n$ wherein $R^1$ has the above meaning. Said alkoxylated alcohol is subsequently alkoxylated with propylene oxide or butylene oxide in a second process step b). Preferably, the alkoxylated alcohol of formula $R^1\text{-}(EO)_n$ is alkoxylated with propylene oxide in order to obtain a surfactant being a diblock copolymer of formula $R^1\text{-}(EO)_n\text{---}(PO)_m$.

In an optional process step c), a further alkoxylation step with ethylene oxide is carried out in order to obtain a surfactant being a triblock copolymer of formula $R_1\text{-}(EO)_n\text{---}(PO)_m\text{-}(EO)_p$.

The alkoxylation can be carried out, for example, using alkaline catalysts, such as alkali metal hydroxides or alkali metal alkoxides. The use of these catalysts results in special properties, in particular the distribution of the degree of alkoxylation.

The alkoxylation can additionally be carried out using Lewis-acidic catalysis with the special properties resulting therefrom, in particular in the presence of $BF_3 \times H_3PO_4$, $BF_3$ dietherate, $SbCl_5$, $SnCl_4 \times 2\ H_2O$, hydrotalcite. Suitable as catalyst are also double metal cyanimide compounds (DMC).

In this process, the excess alcohol can be distilled off, or the alkoxylate can be obtained by a two-stage process. The preparation of mixed alkoxylates from, for example, EO and PO is also possible, in which case firstly a polyethylene oxide block can join to the alkanol radical, followed by an ethylene oxide block, or firstly an ethylene oxide block and then a propylene oxide block. Random distributions are also possible. Preferred reaction conditions are given below.

The alkoxylation is preferably catalyzed by strong bases, which are expediently added in the form of an alkali metal hydroxide or alkaline earth metal hydroxide, usually in an amount of from 0.1 to 1% by weight, based on the amount of the alkanol $R^1OH$ or $R^3OH$. (Cf. G. Gee et al., J. Chem. Soc. (1961), p. 1345; B. Wojtech, Makromol. Chem. 66, (1966), p. 180.)

An acidic catalysis of the addition reaction is also possible. In addition to Bronsted acids, Lewis acids are also suitable, such as, for example, $AlCl_3$ or $BF_3$. (Cf. P. H. Plesch, The Chemistry of Cationic Polymerization, Pergamon Press, New York (1963).

In principle, all suitable compounds known to a person skilled in the art may be used as a DMC compound.

DMC compounds suitable as a catalyst are described, for example, in WO 99/16775. The following are particularly suitable as a catalyst for the alkoxylation of a double metal cyanide compound of the formula (II):

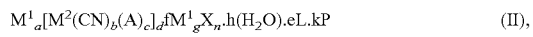

$$M^1{}_a[M^2(CN)_b(A)_c]_d fM^1{}_g X_n \cdot h(H_2O) \cdot eL \cdot kP \qquad (II),$$

Wherein
$M^1$ is at least one metal ion selected from the group consisting of $Zn^{2+}$, $Fe^{2+}$, $Fe^{3+}$, $Co^{2+}$, $Ni^{2+}$, $Mn^{2+}$, $Co^{2+}$, $Sn^{2+}$, $Pb^{2+}$, $Mo^{4+}$, $Mo^{6+}$, $Al^{3+}$, $V^{4+}$, $V^{5+}$, $Sr^{2+}$, $W^+$, $W^{6+}$, $Cr^{2+}$, $Cr^{3+}$, $Cd^{2+}$, $Hg^{2+}$, $Pd^{2+}$, $Pt^{2+}$, $V^{2+}$, $Mg^{2+}$, $Ca^{2+}$, $Ba^{2+}$, $Cu^{2+}$, $La^{3+}$, $Ce^{3+}$, $Ce^{4+}$, $Eu^{3+}$, $Ti^{3+}$, $Ti^{4+}$, $Ag^+$, $Rh^{2+}$, $Rh^{3+}$, $Ru^{2+}$ and $Ru^{3+}$, $M^2$ is at least one metal ion selected from the group consisting of $Fe^{2+}$, $Fe^{3+}$, $Co^{2+}$, $Co^{3+}$, $Mn^{2+}$, $Mn^{3+}$, $V^{4+}$, $V^{5+}$, $Cr^{2+}$, $Cr^{3+}$, $Rh^{3+}$, $Ru^{2+}$ and $Ir^{3+}$, A and X, independently of one another, are each an anion selected from the group consisting of halide, hydroxide, sulfate, carbonate, cyanide, thiocyanate, isocyanate, cyanate, carboxylate, oxalate, nitrate, nitrosyl, hydrogen sulfate, phosphate, dihydrogen phosphate, hydrogen phosphate and bicarbonate, L is a water-miscible ligand selected from the group consisting of alcohols, aldehydes, ketones, ethers, polyethers, esters, polyesters, polycarbonate, ureas, amides, primary, secondary and tertiary amines, ligands having pyridine nitrogen, nitriles, sulfides, phosphides, phosphites, phosphines, phosphonates and phosphates, k is a fraction or integer greater than or equal to zero and P is an organic additive, a, b, c, d, g and n are selected so that the electroneutrality of the compound (II) is ensured, it being possible for c to be 0, e is the number of ligand molecules and is a fraction or integer greater than 0 or 0, f, h and m, independently of one another, are a fraction or integer greater than 0 or 0.

Examples of organic additives P are: polyether, polyester, polycarbonates, polyalkylene glycol sorbitan ester, polyalkylene glycol glycidyl ether, polyacrylamide, poly(acrylamide-co-acrylic acid), polyacrylic acid, poly(acrylamide-co-maleic acid), polyacrylonitrile, polyalkylene acrylates, polyalkyl methacrylates, polyvinyl methyl ether, polyvinyl ethyl ether, polyvinyl acetate, polyvinyl alcohol, poly-N-vinylpyrrolidone, poly(N-vinylpyrrolidone-co-acrylic acid), polyvinyl methyl ketone, poly(4-vinylphenol), poly(acrylic acid-co-styrene), oxazoline polymers, polyalkylenimines, maleic acid and maleic anhydride copolymers, hydroxyethylcellulose, polyacetates, ionic surface-active and interface-active compounds, gallic acid or salts, esters or amides thereof, carboxylic esters of polyhydric alcohols and glycosides.

These catalysts may be crystalline or amorphous. Where k is zero, crystalline double metal cyanide compounds are preferred. Where k is greater than zero, crystalline, semicrystalline and substantially amorphous catalysts are preferred.

There are various preferred embodiments of the modified catalysts. A preferred embodiment comprises catalysts of the formula (I) in which k is greater than zero. The preferred catalyst then contains at least one double metal cyanide compound, at least one organic ligand and at least one organic additive P.

In another preferred embodiment, k is zero, e is optionally also zero and X is exclusively a carboxylate, preferably formate, acetate or propionate. Such catalysts are described in WO 99/16775. In this embodiment, crystalline double metal cyanide catalysts are preferred. Furthermore, double metal cyanide catalysts as described in WO 00/74845, which are crystalline or lamellar, are preferred.

The modified catalysts are prepared by combining a metal salt solution with a cyanometallate solution, which solution may optionally contain both an organic ligand L and an organic additive P. The organic ligand and optionally the organic additive are then added. In a preferred embodiment of the catalyst preparation, an inactive double metal cyanide phase is first prepared and this is then converted into an active double metal cyanide phase by recrystallization, as described in PCT/EP01/01893.

In another preferred embodiment of the catalysts, t e and k are not zero. These are double metal cyanide catalysts which contain a water-miscible organic ligand (in general in amounts of from 0.5 to 30% by weight) and an organic additive (in general in amounts of from 5 to 80% by weight), as described in WO 98/06312. The catalysts can be prepared either with vigorous stirring (24 000 rpm using a Turrax) or with stirring, as described in U.S. Pat. No. 5,158,922.

Double metal cyanide compounds which contain zinc, cobalt or iron or two thereof are particularly suitable as a catalyst for the alkoxylation. For example, Prussian blue is particularly suitable.

Crystalline DMC compounds are preferably used. In a preferred embodiment, a crystalline DMC compound of the Zn—Co type which contains zinc acetate as a further metal salt component is used. Such compounds crystallize in a monoclinic structure and have a lamellar habit. Such compounds are described, for example, in WO 00/74845 or PCT/EP01/01893.

DMC compounds suitable as a catalyst can in principle be prepared by all methods known to a person skilled in the art. For example, the DMC compounds can be prepared by direct precipitation, the incipient wetness method, by preparation of a precursor phase and subsequent recrystallization.

The DMC compounds can be used in the form of a powder, paste or suspension or can be shaped to give a molding, introduced into moldings, foams or the like or applied to moldings, foams or the like.

The catalyst concentration used for the alkoxylation, based on the final quantity range, is typically less than 2 000 ppm, preferably less than 1 000 ppm, in particular less than 500 ppm, particularly preferably less than 100 ppm, for example less than 50 ppm.

The addition reaction is carried out at temperatures of from about 90 to about 240° C., preferably from 120 to 180° C., in a closed vessel. The alkylene oxide or the mixture of different alkylene oxides is added to the mixture of alkanol mixture according to the invention and alkali ander the vapor pressure of the alkylene oxide mixture which prevails at the chosen reaction temperature. If desired, the alkylene oxide can be diluted by up to 30 to 60% with an inert gas. This ensures additional safety against explosion-like polyaddition of the alkylene oxide.

If an alkylene oxide mixture is used, then polyether chains are formed in which the various alkylene oxide building blocks are distributed in a virtually random manner. Variations in the distribution of the building blocks along the polyether chain arise as a result of different rates of reaction of the components and can also be achieved voluntarily through the continuous introduction of an alkylene oxide mixture of program-controlled composition. If the different alkylene oxides are reacted one after the other, polyether chains are obtained which have a block-like distribution of the alkylene oxide building blocks.

The length of the polyether chains varies within the reaction product statistically about an average value which essentially corresponds to the stoichiometric value which arises from the amount added.

For carrying out the reaction, the catalyst can be added to the alcohol $R^1OH$ or $R^3OH$. By means of reduced pressure (for example <100 mbar) and/or by increasing the temperature (30 to 150° C.), water still present in the mixture can be removed.

Thereafter, inert conditions are established with inert gas (e.g. nitrogen) and the ethylene oxide is added stepwise at temperatures of from 60 to 180° C. up to a pressure of not more than 10 bar. Usually, not more than 1000 ppm of catalyst, based on the mixture, are used and, owing to this small amount, the catalyst can remain in the product. The amount of catalyst may as a rule be less than 1000 ppm, for example 250 ppm or less.

However, the invention is not limited to the use of double metal cyanide catalysts for carrying out the alkoxylation. In principle, all processes which lead to alkoxylated alcohols which have a narrower molecular weight distribution—in comparison with base catalysis with KOH—can be used for the alkoxylation of the alcohol $R^1$—OH. In other words, all methods in which the ratio $D_V/D_{KOH}$ is <1 are suitable, $D_V$ being the polydispersity of a product obtained by means of the process used and $D_{KOH}$ being the polydispersity of a product obtained by means of KOH catalysis.

The inventive surfactants are applicable for various uses and compositions.

Accordingly, the present invention is further directed to the use of a surfactant as described above in cleaning formulations, cosmetic and pharmaceutical formulations, finishes, coating materials, paints, pigment preparations and adhesives, leather decreasing agents, formulations for the textile industry, fiber processing formulations for the paper and pulp industry, metal processing formulations, oil production applications, oil field applications, tertiary oil production, food industry applications, water treatment, fermentation, mineral processing and dust control, building assistants, emulsion polymerization and preparation of dispersions, coolants and lubricants.

The present invention is also directed to a detergent, cleaning agent, wetting agent, coating material, adhesive, leather fatliquoring agent, humectant or textile treatment composition, additive for mineral building materials or cosmetic, additive for mineral oil formulations, pharmaceutical or crop protection formulation, containing the surfactant as described above.

The scope and interest of the invention will be better understood based on the following examples which are intended to illustrate certain embodiments of the invention and are non-limitative.

EXAMPLES

A Alkoxylation of a 2-Propylheptanol Isomer Mixture with EO and PO by Means of KOH Catalysis The 2-propylheptan-1-ol (2PH) used was an isomer mixture comprising 87% of 2-propylheptan-1-ol, 11% of 2-propyl-4-methylhexan-1-ol and <1% of 2-propyl-5-methylhexan-1-ol.

1. 2PH+6.0 EO+3.0 PO 158.3 g (1.0 mol) of 2-propylheptanol isomer mixture and 1.2 g of 50% strength by weight potassium hydroxide solution were mixed and were dewatered in an autoclave at 80° C. and <10 mbar for 30 minutes. The autoclave was rendered inert with nitrogen and then heated to 145-155° C. First, 264 g (6.0 mol) of ethylene oxide were metered in to synthesize the first EO block and were allowed to react for about 1 hour until the pressure was constant. Thereafter, the internal temperature of the autoclave was reduced to 125-135° C., and 168 g (3.0 mol) of propylene oxide were then metered in to synthesize the PO block and were allowed to react for about 5 hours until the pressure was constant. Evacuation was effected for devolatilization, the reaction product was then brought to a pH of from 6 to 7 by adding acetic acid at 80° C. and finally the reactor was emptied.

2. 2PH+4.0 EO+5.0 PO

The preparation was carried out analogously to example 1. 158.3 g (1.0 mol) of 2-propylheptanol isomer mixture, 220 g (5.0 mol) of ethylene oxide for the first EO block, 224 g (4.0 mol) of propylene oxide for the PO block, and 1.2 g of 50% strength by weight potassium hydroxide solution were used.

3. 2PH+5.0 EO+15.0 PO 137.9 g (0.87 mol) of 2-Propylheptanol and 4.07 g of 50% strength by weight potassium hydroxide solution were mixed and were dewatered in an autoclave at 100° C. and <10 mbar for 2 hours. The autoclave was rendered inert with nitrogen and then heated to 120-130° C. First, 193 g (4.38 mol) of ethylene oxide were metered in to synthesize the first EO block and were allowed to react until the pressure was constant. Thereafter 761 g (13.10 mol) of propylene oxide were then metered in to synthesize the PO block and were allowed to react until the pressure was constant. Volatile components were removed at 90° C. at 20 mbar for 2 hours.

4. 2PH+5.0 PO+2.0 EO (Comparative)

158.3 g (1.0 mol) of 2-propylheptanol isomer mixture and 1.0 g of 50% strength by weight potassium hydroxide solution were mixed and were dewatered in an autoclave at 80° C. and <10 mbar for 30 minutes. The autoclave was rendered inert with nitrogen and then heated to 125-135° C. First, 280 g (5.0 mol) of propylene oxide were metered in to synthesize the PO block and were allowed to react for about 1 hour until the pressure was constant. Thereafter, the internal temperature of the autoclave was increased to 145-155° C., and 88 g (2.0 mol) of ethylene oxide were then metered in to synthesize the EO block and were allowed to react for about 5 hours until the pressure was constant. Evacuation was effected for devolatilization, the reaction product was then brought to a pH of from 6 to 7 by adding acetic acid at 80° C. and finally the reactor was emptied.

5. 2PH+15.0 PO (Comparative)

158.3 g (1.0 mol) of 2-propylheptanol isomer mixture and 4.1 g of 50% strength by weight potassium hydroxide solution were mixed and were dewatered in an autoclave at 80° C. and <10 mbar for 30 minutes. The autoclave was rendered inert with nitrogen and then heated to 125-135° C. 871.2 g (15.0 mol) of propylene oxide were metered in to synthesize the PO block and were allowed to react for about 1 hour until the pressure was constant. Evacuation was effected for devolatilization, the reaction product was then brought to a pH of from 6 to 7 by adding acetic acid at 80° C. and finally the reactor was emptied.

B Alkoxylation of an Iso-Tridecanol Isomer Mixture (TDN-Alcohol) with EO, PO and EO by Means of KOH Catalysis The iso-tridecanol isomer mixture (TDN-alcohol) used was prepared by trimerization of an isomer mixture of butene and subsequent hydroformulation and hydrogenation according to examples 1 and 2 of WO 01/36356 A2.

6. TDN+5.0 EO+5.0 PO+2.0 EO 200.4 g (1.0 mol) of TDN-alcohol isomer mixture and 1.6 g of 50% strength by weight potassium hydroxide solution were mixed and were dewatered in an autoclave at 80° C. and <10 mbar for 30 minutes. The autoclave was rendered inert with nitrogen and then heated to 145-155° C. First, 220 g (5.0 mol) of ethylene oxide were metered in to synthesize the first EO block and were allowed to react for about 1 hour until the pressure was constant. Thereafter, the internal temperature of the autoclave was reduced to 125-135° C., and 280 g (5.0 mol) of propylene oxide were then metered in to synthesize the PO block and were allowed to react for about 5 hours until the pressure was constant. Finally, the internal temperature was increased again to 145-155° C., and 88.0 g (2.0 mol) of ethylene oxide were metered in to synthesize the second EO block and were allowed to react for about 1 hour until the pressure was constant. Evacuation was effected for devolatilization, the reaction product was then brought to a pH of from 6 to 7 by adding acetic acid at 80° C. and finally the reactor was emptied.

7. TDN+5.0 EO+18.0 PO+2.0 EO 260.0 g (1.3 mol) of Tridecanol N and 8.10 g of 50% strength by weight potassium hydroxide solution were mixed and were dewatered in an autoclave at 100° C. and <10 mbar for 2 hours. The autoclave was rendered inert with nitrogen and then heated to 120-130° C. First, 286.3 g (6.5 mol) of ethylene oxide were metered in to synthesize the first EO block and were allowed to react until the pressure was constant. Thereafter 1359.5 g (23.4 mol) of propylene oxide were then metered in to synthesize the PO block and were allowed to react until the pressure was constant. Thereafter 114.5 g (2.6 mol) of ethylene oxide were then metered in to synthesize the second EO block and were allowed to react until the pressure was constant. Volatile components were removed at 90° C. at 20 mbar for 2 hours.

8. TDN+5.0 PO+2.0 EO (Comparative)

200.4 g (1.0 mol) of TDN-alcohol isomer mixture and 1.1 g of 50% strength by weight potassium hydroxide solution were mixed and were dewatered in an autoclave at 80° C. and <10 mbar for 30 minutes. The autoclave was rendered inert with nitrogen and then heated to 125-135° C. First, 280 g (5.0 mol) of propylene oxide were metered in to synthesize the PO block and were allowed to react for about 1 hour until the pressure was constant. Thereafter, the internal temperature of the autoclave was increased to 145-155° C., and 88 g (2.0 mol) of ethylene oxide were then metered in to synthesize the EO block and were allowed to react for about 5 hours until the pressure was constant. Evacuation was effected for devolatilization, the reaction product was then brought to a pH of from 6 to 7 by adding acetic acid at 80° C. and finally the reactor was emptied.

9. TDN+3.0 PO (Comparative)

200.4 g (1.0 mol) of TDN-alcohol isomer mixture and 1.50 g of 50% strength by weight potassium hydroxide solution were mixed and were dewatered in an autoclave at 80° C. and <10 mbar for 30 minutes. The autoclave was rendered inert with nitrogen and then heated to 125-135° C.

174.2 g (3.0 mol) of propylene oxide were metered in to synthesize the PO block and were allowed to react for about 1 hour until the pressure was constant. Evacuation was effected for devolatilization, the reaction product was then brought to a pH of from 6 to 7 by adding acetic acid at 80° C. and finally the reactor was emptied.

10. TDN+18.0 PO (Comparative)

The preparation was carried out analogously to example 9. 200.4 g (1.0 mol) of TDN-alcohol isomer mixture and 1045.4 g (18.0 mol) of propylene oxide were used.

C Alkoxylation of an iso-tridecanol isomer mixture (TDA-alcohol) with EO and PO by means of KOH catalysis TDA-alcohol is a commercially available iso-tridecanol isomer mixture (CAS-No. 68526-86-3).

11. TDA+5.0 EO+16.0 PO 260.0 g (1.3 mol) of TDA-alcohol isomer mixture and 7.02 g of 50% strength by weight potassium hydroxide solution were mixed and were dewatered in an autoclave at 100° C. and <10 mbar for 2 hours. The autoclave was rendered inert with nitrogen and then heated to 120-130° C. First, 286.3 g (6.5 mol) of ethylene oxide were metered in to synthesize the first EO block and were allowed to react until the pressure was constant. Thereafter 1208.3 g (20.8 mol) of propylene oxide were then metered in to synthesize the PO block and were allowed to react until the pressure was constant. Volatile components were removed at 90° C. at 20 mbar for 2 hours.

12. TDA+5.0 EO+23.0 PO

The preparation was carried out analogously to example 11. 260.0 g (1.0 mol) of TDA-alcohol isomer mixture, 286.3 g (6.5 mol) of ethylene oxide for the first EO block, 1736.9 g (29.9 mol) of propylene oxide for the PO block, and 9.13 g of 50% strength by weight potassium hydroxide solution were used.

13. TDA+15.0 PO (Comparative)

260.0 g (1.3 mol) of TDA-alcohol isomer mixture and 5.57 g of 50% strength by weight potassium hydroxide solution were mixed and were dewatered in an autoclave at 100° C. and <10 mbar for 2 hours. The autoclave was rendered inert with nitrogen and then heated to 120-130° C. 1132.6 g (19.5 mol) of propylene oxide were then metered in to synthesize the PO block and were allowed to react until the pressure was constant. Volatile components were removed at 90° C. at 20 mbar for 2 hours.

Biodegradability of the surfactants was determined according to Organization for economic cooperation and development (OECD) test method OECD 301B and F. The results are summarized in Table 1.

TABLE 1

Biodegradability of the inventive and comparative surfactants

| | Alkyl | EO | PO | EO | Biodegradability [%] |
|---|---|---|---|---|---|
| 1 | 2PH | 6 | 3 | | 90[1] |
| 2 | 2PH | 4 | 5 | | 80[1] |
| 3 | 2PH | 5 | 15 | | 80[2] |
| 4 | 2PH | | 5 | 2 | 40[1] |
| 5 | 2PH | | 15 | | 30[2] |
| 6 | TDN | 5 | 5 | 2 | 70[1] |
| 7 | TDN | 5 | 18 | 2 | 70[2] |
| 8 | TDN | | 5 | 2 | 30[1] |
| 9 | TDN | | 3 | | 50[2] |
| 10 | TDN | | 18 | | 20[2] |
| 11 | TDA | 5 | 16 | | 65[2] |
| 12 | TDA | 5 | 23 | | 60[2] |
| 13 | TDA | | 15 | | 20[2] |

[1] based on OECD 301 B test method using a test medium from Zurich.
[2] based on OECD 301 F test method using a test medium from Mannheim.

As can be gathered from Table 1, the inventive surfactants comprising an EO block adjacent to the alcohol residue 2PH, TDN or TDA show biodegradability values of 60% or higher and are, therefore, readily biodegradable. The surfactants according to comparative examples 4, 5, 8 to 10 and 13 comprising a PO block adjacent to the alcohol residue, on the other hand, are not readily biodegradable.

The invention claimed is:

1. A surfactant of formula (I)

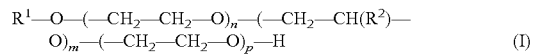
(I)

wherein $R^1$ is selected from the group consisting of 2-dodecyl, 2-ethylhexyl, 2-propylheptyl, iso-tridecyl, 2-tetradecyl, 2-hexadecyl, 7-ethyl-3-decyl, 3-methyl-6-ethyl-2-nonyl, 2-hexadecyl, 2-octadecyl, 3-nonadecyl, 3-methyl-2-octadecyl, 3-methyl-2-hexadecyl, 3-heptadecyl, iso-decyl, iso-undecyl, iso-dodecyl, 2-butyloctyl, 2-pentylnonyl and 2-hexyldecyl, $R^2$ stands for methyl, n is in the range of 4 to 6, m is in the range of 5 to 20, and p is in the range of 1 to 25;

and wherein the ratio n/m is in the range of 0.05 to 3.0 and the ratio p/m is in the range of greater than 0.0 to 5.0.

2. The surfactant according to claim 1, wherein n is in the range of 5 to 6, m is in the range of 6 to 18, and p is in the range of greater than 0 to 2.

3. The surfactant according to claim 1, wherein m is in the range of 10 to 20.

4. A surfactant of formula (Ia)

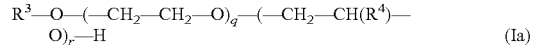
(Ia)

wherein $R^3$ is iso-tridecyl, $R^4$ stands for methyl, q is in the range of 4 to 6, and r is in the range of 3 to 35.

5. The surfactant according to claim 4, wherein the ratio q/r is in the range of 0.05 to 3.0.

6. The surfactant according to claim 4, wherein q is in the range of 5 to 6 and r is in the range of 6 to 18.

7. The surfactant according to claim 1, wherein $R^1$ is selected from the group consisting of 2-propylheptyl and iso-tridecyl.

8. The surfactant according to claim 1, wherein said surfactant is biodegradable.

9. The surfactant according to claim 8, wherein biodegradability is achieved at decomposition percentages of at least 60% determined in accordance with OECD 301B or OECD 301F.

10. A process for the preparation of a surfactant according to claim 1, comprising the steps of
   a) reacting an alcohol of formula $R^1OH$ with ethylene oxide under alkoxylation conditions,
   b) reacting the product obtained in step a) with propylene oxide or butylene oxide under alkoxylation conditions, and
   c) reacting the product obtained in step b) with ethylene oxide under alkoxylation conditions, thereby obtaining the surfactant of formula (I).

11. A cleaning formulation, cosmetic formulation, pharmaceutical formulation, finish, coating material, paint, formulation for pigment preparation, adhesive, leather decreasing agent, formulation for the textile industry, fiber processing formulation for the paper and pulp industry, metal processing formulation, formulation for oil production applications, formulation for oil field applications, formulation for tertiary oil production, formulation for food industry applications, formulation for water treatment, formulation for fermentation, formulation for mineral processing and dust control, formulation for building assistants, formulation for emulsion polymerization and preparation of dispersions, or coolant or lubricant, comprising the surfactant according to claim 1.

12. A detergent, cleaning agent, wetting agent, coating material, adhesive, leather fatliquoring agent, humectant or textile treatment composition, additive for mineral building materials or cosmetic, additive for mineral oil formulations, pharmaceutical or crop protection formulation, comprising the surfactant according to claim 1.

13. The surfactant according to claim 5, wherein q is in the range of 5 to 6 and r is in the range of 6 to 18.

14. The surfactant according to claim 4, wherein q is 5 and r is in the range of 16 to 23.

15. The surfactant according to claim 1, wherein $R^1$ is iso-tridecyl, n is in the range of 4 to 6, m is in the range of 5 to 18, and p is in the range of 2 to 4.

16. The surfactant according to claim 4, wherein q is 5, and r is in the range of 16 to 20.

17. The process according to claim 10, wherein $R^1$ is iso-tridecyl.

* * * * *